United States Patent
Sasson et al.

(10) Patent No.: US 8,925,027 B2
(45) Date of Patent: Dec. 30, 2014

(54) PARTICIPANT AWARE CONFIGURATION FOR VIDEO ENCODER

(75) Inventors: Roi Sasson, New York, NY (US);
Jonathan Lennox, Jersey City, NJ (US);
Stephen Cipolli, Nanuet, NY (US);
Boris Levi, Fair Lawn, NJ (US); Ofer Shapiro, Fair Lawn, NJ (US); Wonkap Jang, Edgewater, NJ (US); Michael Horowitz, Austin, TX (US)

(73) Assignee: Vidyo, Inc., Dallas, TX (US)

( * ) Notice: Subject to any disclaimer, the term of this patent is extended or adjusted under 35 U.S.C. 154(b) by 285 days.

(21) Appl. No.: 13/010,241

(22) Filed: Jan. 20, 2011

(65) Prior Publication Data

US 2012/0192240 A1 Jul. 26, 2012

(51) Int. Cl.
| | |
|---|---|
| *H04N 7/173* | (2011.01) |
| *H04N 21/258* | (2011.01) |
| *H04N 7/15* | (2006.01) |
| *H04N 21/2343* | (2011.01) |
| *H04N 19/196* | (2014.01) |
| *H04N 19/164* | (2014.01) |
| *H04N 19/187* | (2014.01) |
| *H04N 19/30* | (2014.01) |
| *H04N 19/61* | (2014.01) |

(52) U.S. Cl.
CPC ......... *H04N 21/25833* (2013.01); *H04N 7/152* (2013.01); *H04N 21/234327* (2013.01); *H04N 21/25858* (2013.01); *H04N 19/00369* (2013.01); *H04N 19/00236* (2013.01); *H04N 19/00321* (2013.01); *H04N 19/00424* (2013.01); *H04N 19/00781* (2013.01)
USPC .......................................... 725/116; 725/105

(58) Field of Classification Search
None
See application file for complete search history.

(56) References Cited

U.S. PATENT DOCUMENTS

| | | | | |
|---|---|---|---|---|
| 6,084,909 | A * | 7/2000 | Chiang et al. | 375/240.03 |
| 2005/0135476 | A1* | 6/2005 | Gentric et al. | 375/240.1 |
| 2006/0203917 | A1* | 9/2006 | Uchida et al. | 375/240.24 |
| 2006/0215750 | A1* | 9/2006 | Izawa | 375/240.01 |
| 2006/0282855 | A1* | 12/2006 | Margulis | 725/43 |
| 2007/0200923 | A1* | 8/2007 | Eleftheriadis et al. | 348/14.08 |
| 2008/0144723 | A1* | 6/2008 | Chen et al. | 375/240.26 |
| 2008/0165864 | A1* | 7/2008 | Eleftheriadis et al. | 375/240.29 |
| 2010/0149306 | A1* | 6/2010 | Gopal et al. | 348/14.09 |
| 2010/0220728 | A1* | 9/2010 | Williams et al. | 370/394 |
| 2011/0090967 | A1* | 4/2011 | Chen et al. | 375/240.16 |

OTHER PUBLICATIONS

International Search Report and Written Opinoin for PCT/US2011/021864 dated Mar. 21, 2011.

* cited by examiner

*Primary Examiner* — Chenea Smith
(74) *Attorney, Agent, or Firm* — Baker Botts, L.L.P.

(57) ABSTRACT

Systems and methods for multipoint video distribution are disclosed herein. In some embodiments, system for multipoint video distribution include at least one endpoint including a EECM and a DECM, and at least one server including a SECM, the server being coupled to the endpoint. In some embodiments, methods for configuring an encoder include receiving at least one property related to a capability of a decoder, determining a number of layers to be coded by the encoder, and configuring the encoder based on that at least one property.

11 Claims, 7 Drawing Sheets

PARTICIPANT AWARE CONFIGURATION FOR VIDEO ENCODER

CROSS-REFERENCE TO RELATED APPLICATIONS

This application is related to U.S. Pat. Nos. 7,593,032 and 7,701,851, the disclosures of which are hereby incorporated by reference in their entireties.

FIELD

This application relates to multipoint video distribution. More specifically, it relates mechanisms that enhance the settings of video encoders in a multipoint video distribution system.

BACKGROUND

Centralized video conferencing uses a—sometimes degenerated—star topology: endpoints connect to a central switching device, often known as a "Multipoint Control Unit" or "MCU". Traditional MCUs handle the "routing" of the incoming video streams, transcoding to an appropriate frame rate, resolution, video coding standard or other properties, audio mixing, and so on. They further handle call control issues, not only between the endpoints and the MCU, but also related to conference global control properties. As such, MCUs are not only expensive and form single point of failure, but also (due to the often required transcoding) add delay, video quality degradation, and other undesirable side effects.

Multipoint video conferences can also be established using a full mesh topology, but that has the disadvantage of requiring substantially higher networking resources for larger conferences, as well as substantially higher computational demands in case of a heterogeneous endpoint population.

Multipoint video conferencing that avoids the transcoding MCU, but still allows for the network resource savings only a star topology can offer, are known. Specifically, in one architecture, the MCU is replaced by a device, known as Scalable Video Conferencing Switch (SVCS) that manipulates the incoming compressed video bitstreams in the compressed domain before sending them to the respective endpoint. This is enabled by the use of a layered coding technology known as "Scalable Video Coding", for which the bitstream syntax and decoding process are formally specified in ITU-T Rec. H.264 Annex G. ITU-T Rec. H.264 and its Annexes can be obtained from the International telecommunications Union, Place de Nations, 1120 Geneva, Switzerland, or www.itu.int.

A layered video bitstream, as received by the SVCS, includes a base layer, and may include one or more of each temporal, spatial, or SNR enhancement layers. All layers stand in a well-defined use relationship with each other. The SVCS can discard certain layers that it has received before sending the thinned layered bitstream on to the endpoint. Thinning can be caused by transmission errors, decoder capabilities, connectivity issues (that may be reported through RTCP receiver reports) and other factors, as described, for example, in U.S. Pat. No. 7,593,032.

While the SVCS efficiently manages the video traffic of its outgoing ports, in a traditional system setup, each endpoint sends to the SVCS the "best" video content it can produce and transmit. There are two main factors that determine what "best" means: first, the endpoints computational power and other hardware based resource issues. For example, an endpoint running on a slow laptop hardware may not be able to encode 720p60 video streams. Second, an endpoint connected over a slow (e.g. 384 kbit/s) link cannot transmit 720p60 video in useful quality, even if it were capable to do so based from a computational resources viewpoint.

A similar situation exists in traditional MCU-based systems: the capabilities and operation points of the (today: single-layer) video codecs in the endpoint are determined by the endpoint's and MCU port's capabilities, and the available bandwidth. The MCU hides these properties from the other endpoints connected to it.

This setup has advantages from an architectural viewpoint—endpoints do not need to consider the capabilities of other endpoints, of which there could be many in a single conference. However, it has also the disadvantage of unnecessarily using both CPU and network resources in the sending endpoints in many scenarios. CPU resources translate to power consumption, which is critical in mobile applications but also increasingly important for non-mobile endpoints in today's ecologically conscious world. Use of fewer network resources translates into money savings in many cases, directly (when the link has a per traffic charge characteristic) or indirectly (more available traffic for competing, non-video conference traffic results in higher productivity and/or in less demand for connectivity upgrades).

Accordingly, it is advantageous to instruct encoders in endpoints to tailor their outgoing bitstreams not only based on their and the MCU's or SVCS's capabilities, but also based on the needs of the receiving endpoint population of the conference.

SUMMARY

Systems and methods for multipoint video distribution are disclosed herein.

In some embodiments, system for multipoint video distribution include at least one endpoint including a EECM and a DECM, and at least one server including a SECM, the server being coupled to the endpoint.

In some embodiments, methods for configuring an encoder include receiving at least one property related to a capability of a decoder, determining a number of layers to be coded by the encoder, and configuring the encoder based on that at least one property.

DETAILED DESCRIPTION

Figure 1:
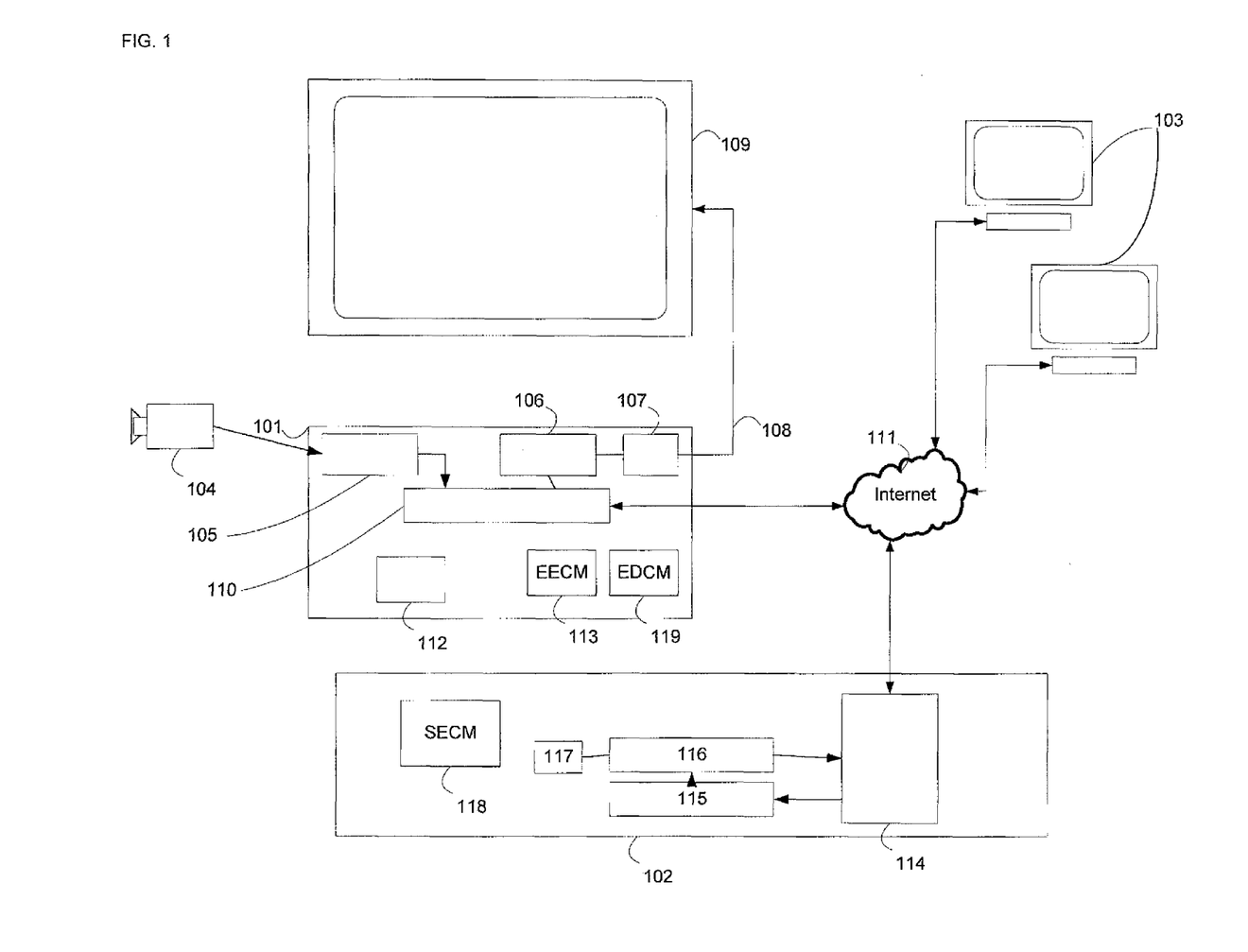
FIG. 1 is a block diagram illustrating an exemplary architecture of a video transmission system in accordance with the present invention.

FIG. 1 depicts a multipoint video conferencing system according to an embodiment of the invention. The system includes at least one endpoint (101) and at least one Scalable Video Conferencing Switch (SVCS) (102). In most practical scenarios, there will be at least one more endpoint (103).

An endpoint according to the invention can include a camera (or other video source) (104) connected to an SVC encoder (105), a SVC decoder (106), display manager (107), video output (108), and video rendering device (109) such as a computer monitor, audio equipment including microphone, loudspeaker, interfaces to those devices, audio encoder and decoder; all not relevant for this disclosure and not depicted, a network interface (110), connected to a suitable network (111), such as a private IP network or the Internet, control logic (112), endpoint encoder configuration manager (EECM) (113) connected to svc encoder (105), SVC decoder (106), display manager (107) and control logic (112) (connections not depicted), and endpoint decoder configuration manager (EDCM) (119), connected to svc encoder (105), SVC decoder (106), display manager (107) and control logic (112) (connections not depicted).

An SVCS (102) can include the following components: a Network interface (114) connected to the suitable network (111), a SVC video extractor (115), configured to extract the SVC coded layers from the incoming streams from the endpoint(s) (101) (103) through network (111) and network interface (114), a SVC stream generator (116), configured to generate an SVC bitstream containing all or a subset of the layers extracted by the SVC video extractor (115), under control of the Layer Control Logic (117), a SVCS Encoder Configuration Manager (SECM) (118), and an audio channel transmission logic; not relevant for this disclosure and not depicted.

The invention presented enables an encoder configuration manager, that can be distributed as at least one EECM (113), at least one EDCM (119) and at least one SECM (118), to determine some configuration parameter values for at least one, but advantageously all, SVC encoders in a point-to-point or multipoint videoconference.

Figure 2:
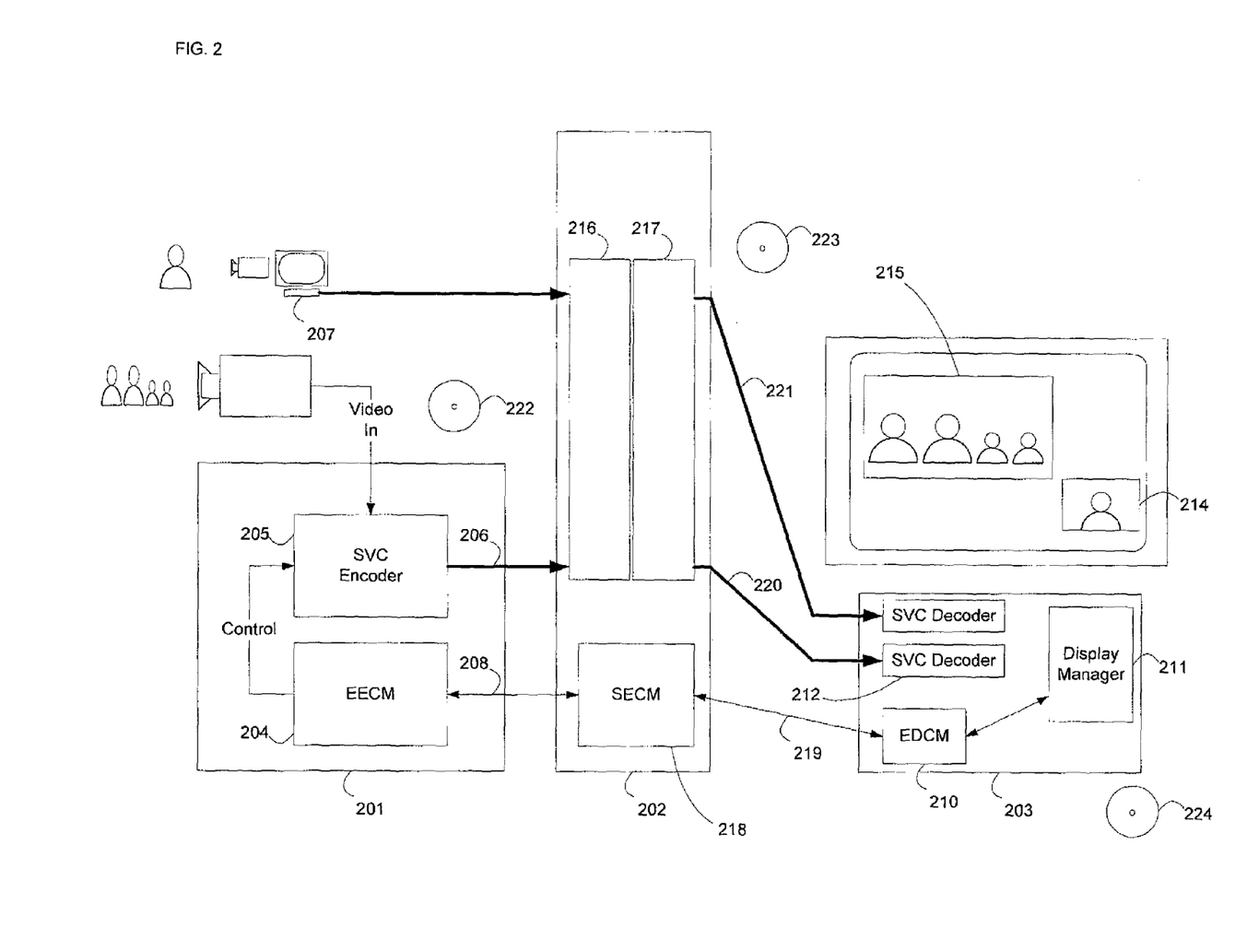
FIG. 2 is a block diagram illustrating an exemplary architecture of a video transmission system in accordance with the present invention.

FIG. 2 depicts a multipoint video conferencing system according to an embodiment of the invention. The system includes a sending endpoint (201), SVCS (202), and a receiving endpoint (203). A sending endpoint may also include all the components of a receiving endpoint and act as a receiving endpoint as well, and vice versa.

The sending endpoint can include EECM (204) and an SVC encoder (205) at least partly under control of the EECM (204) (it may also be under control of the user interface (not depicted) or other modules of the endpoint). The encoder maintains an uplink (206) to the SVCS (202). In practical scenarios, other endpoints (207) may also maintain uplinks with the SVCS to form a multipoint conference. Further, there can be a control channel (208) connecting the EECM (204) and the SECM (209) that can be part of the SVCS (202). Other endpoints (207) may also maintain such a control channel (not depicted). Both uplink (206) and control channel (208) can be virtual connections over the same physical and lower protocol network, for example, private IP network or the Internet (not depicted).

The receiving endpoint can include, amongst other things, an EDCM (210), display manager (211), one or more SVC decoder(s) (212), and a screen (213). The screen has a given screen resolution, measured in pixels. At the time of writing, a common screen resolution is 1920×1080 pixels. On the screen, under control of the display manager (211), one or more windows (214) (215) may show video decoded by the VC decoder(s) (212). Each of the windows has, at any given instance in time, a certain size that can be measured in pixels. In the example of FIG. 2, window (214) has a size of 500×300 pixel in x and y dimension, whereas window (215) has a size of 1280×720 pixels—a resolution commonly known as 720p.

The SVCS can include a video extractor (216) and an SVC stream generator (217) as previously introduced, and an SECM (218). A control channel may be maintained between the SECM (218) and the EDCM in the receiving endpoint (210). Finally, there can be downlinks from the SVC stream generator (217) to the SVC decoder (s) in the endpoint(s); depicted here are two such downlinks: downlink (220) covers coded video data related to sending endpoint (201), whereas downlink (221) covers coded video data related to sending endpoint (207), both destined for receiving endpoint (203) and arriving there at the two SVC decoders (212).

As SVC is a highly flexible standard and the encoder operation is not specified therein, an SVC encoder may need to be told how to encode a bitstream by a number of configuration parameters. The configuration parameters can include the encoded picture area for the largest spatial enhancement layer, the number of spatial layers, frame rate, and others. (In Prior Art systems, the configuration for a particular encoder have been determined by using transmitter side constraints.) Transmitter side constraints can include the characteristics of the uplink and sending endpoint characteristics independent from the uplink, such as the encoder's maximum encodable picture area (for the largest spatial layer) and frame rate in light of the transmitter's available computational resources and camera attributes.

According to the disclosed subject matter, receiver side constraints can also be employed to determine the configuration parameters. Receiver side constraints can include the display window sizes (typically measured in units of pixels) and maximum pixel processing/decoding rates associated with the largest and smallest windows in the active layout of each endpoint in the conference, and the downlink video bandwidth allocated to the bitstreams decoded and rendered into largest and smallest windows in the active layout of each receiver in the conference. The active layout refers to the screen layout of the receiving endpoint—that is, the sizes of the video pictures being displayed, such as windows (214) and (215).

A feature of the disclosed subject matter is to manage the video layers, and their properties being sent over the uplink(s) (206) from the sending endpoint(s) (201) (207) to the SVCS (202), thereby reducing and/or minimizing the bandwidth being used on those uplinks, while still offering the best possible picture quality at the decoding endpoint(s) (203). It does so by controlling the SVC encoder through configuration parameters that may be passed between the sending endpoint's EECM (204) and the SVC encoder (205).

The mechanism to generate the control parameters may be implemented in hardware, software, or a combination of the two, and on EECM, EDCM, SECM, or any combination of the above. In order to enable a software based EECM, EDCM, or SECM, a programmable device, such as a general purpose CPU, programmable gate array, embedded processor or similar, may require instructions, that may be provided over a computer readable media (222, 223, 224) made available to sending endpoint (201), receiving endpoint (203), and/or SVCM (202), as the case may be. Depicted in FIG. 2, as an example for a computer readable media (222, 223, 224) is a CD-ROM; however, any other form of computer readable media such as DVD-ROM, memory stick, ROM, etc. can also be used.

In one embodiment, the majority of the mechanism enabling the generation of control parameters is executed on the EECM of the sending endpoint (204). In the same or another embodiment, the derivation of receiver-side constraints advantageously is performed by the SECM (218), since the SVCS may have ready access to required information. In the same or another embodiment, receiver-side information such as window sizes and decoder capabilities are sent by the receiver-side EDCM(s) (210) to the SECM (218).

In an exemplary embodiment, the configuration for the encoder of the $j^{th}$ endpoint is determined in three stages. In stage one, a maximum encodable picture area and frame rate are determined accounting for constraints imposed by transmitter capability (e.g., computational resources available to the encoder, maximum resolution and frame rate of the camera, etc.) and uplink bandwidth limitations. In the same or another embodiment, stage one is advantageously executed in the sending endpoint's EECM (204).

In a second stage, maximum and minimum window sizes and pixel rates are determined accounting for constraints imposed by the current active layout, CPU capability, and downlink bandwidth for all receivers in the videoconference. In the same or another embodiment, this stage involves the sending of receiving endpoint local information such as window sizes (derived form the current screen layout, known by the display manager (211), maximum pixel processing rates of the SVC Decoder (s) (212), and downlink capacity as known by the receiving endpoint (203) is sent from the receiving endpoint's EDCM (210) to the SECM (218). The SECM can consolidate the information received from all receiving endpoint (s) (203), and can forward the information relevant to each sending endpoint (201) (207) to the EECMs (204) in those sending endpoints.

In a third stage, configuration parameters including picture area of the largest enhancement layer, frame rate, number of spatial layers, and scale factors between spatial layers are derived from the information provided in stages one and two. The three stages are described in more detail in the following.

Stage 1

Figure 4:
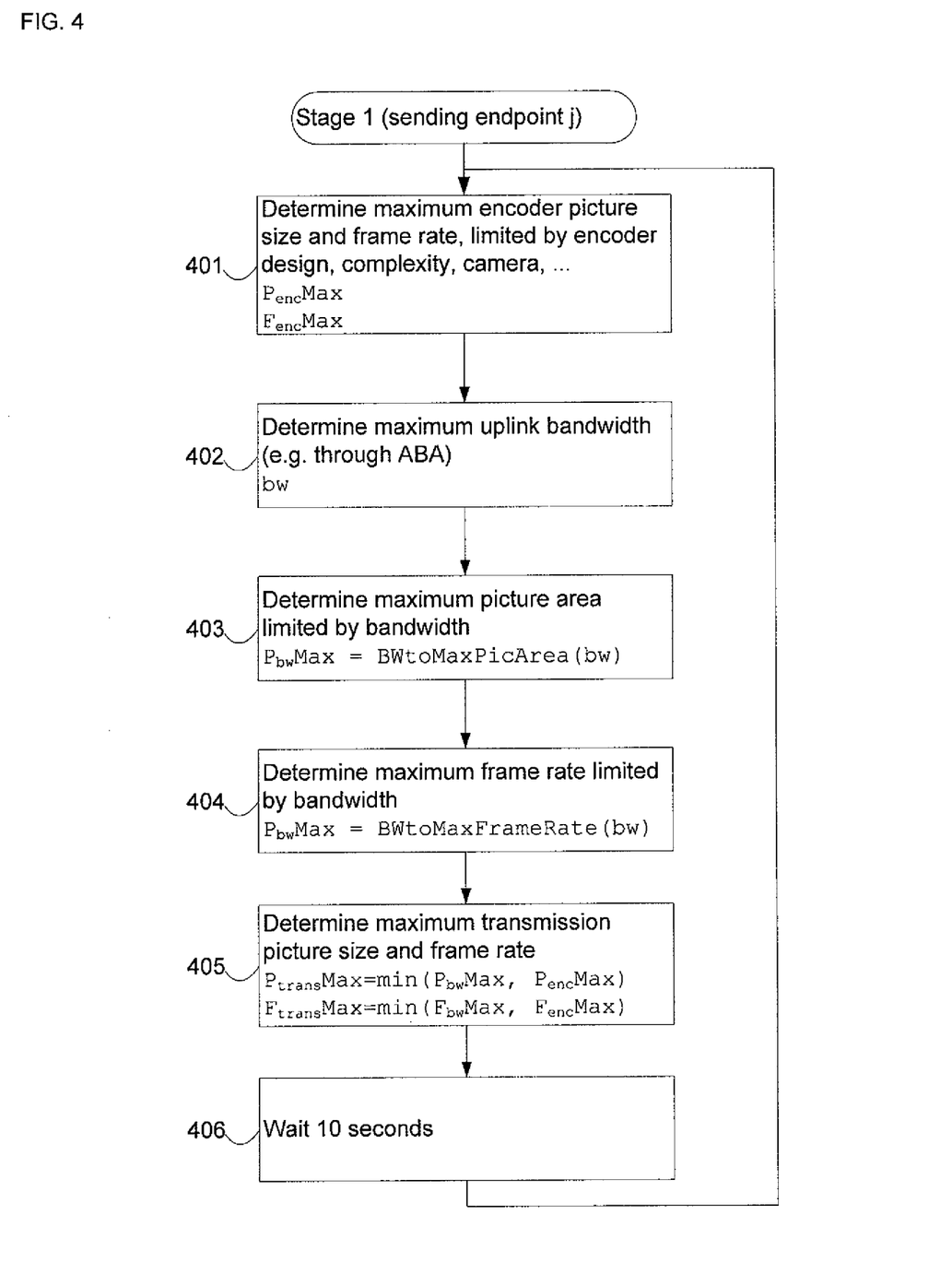
FIG. 4 is an exemplary procedure according to an embodiment of the invention.

In this stage, determined are the maximum encodable picture area, $P_{trans}Max[j]$, and maximum frame rate, $F_{trans}Max[j]$ that the $j^{th}$ encoder can produce given computational constraints of the transmitting endpoint, camera attributes, and available uplink bandwidth. Referring to FIG. 4, the values of $P_{trans}Max[j]$ and $F_{trans}Max[j]$ can be computed by the sending endpoint on which the $j^{th}$ encoder resides as follows. Let the maximum encodable picture area that the $j^{th}$ encoder can encode independently of bandwidth limitations be denoted $P_{enc}Max[j]$. Likewise, let the maximum frame rate that the $j^{th}$ encoder can produce be denoted $F_{enc}Max[j]$. The constraints $P_{enc}Max[j]$ and $F_{enc}Max[j]$ are typically determined (401) by the computational resources available to the $j^{th}$ encoder on the transmitting endpoint and associated camera attributes. To determine the analogous constraints imposed by limited bandwidth, a mechanism known as Automated Bitrate Allocation (ABA) and disclosed in U.S. Pat. No. 7,701,851 can be used to determine (402) the uplink bandwidth available to the $j^{th}$ encoder, $bw_j$. A lookup function BWtoMaxPicArea($bw_j$) can be used to determine (403) a maximum encodable picture area, $P_{bw}Max[j]$ that $bw_j$ can supported. Similarly, the function BWtoMaxFrameRate($bw_j$) can be used to determine (404) the maximum frame rate, $F_{bw}Max[j]$, that $bw_j$ can support.

The lookup function BWtoMaxPicArea( ) may be implemented as a table lookup in which the bandwidth is used as an index into the table and the maximum encodable picture area supported by that bandwidth is the value referenced by that index. The mapping is advantageously adapted to the efficiency of the video compression technology in use; both based on standard (bit stream efficiency) and implementation (encoder quality). Table 1 provides one example for a sensible choice of the lookup table for an SVC encoder running in software on an Intel multicore CPU.

TABLE 1

| Bandwidth (Kbps) | Max Encoded Picture Area (pixels) |
| --- | --- |
| 0 ... 200 | 320 × 180 |
| 200 ... 500 | 640 × 360 |
| 500 ... 1000 | 1280 × 720 |

BWtoMaxFrameRate( ) may be implemented as a look up table in which the bandwidth is used as an index into the table and the maximum encoded frame rate supported by that bandwidth is the value referenced by that index. The same remarks apply as made above when discussing BWtoMaxPicArea( ).

TABLE 2

| Bandwidth (Kbps) | Max Encoded Frame rate (frames per second) |
| --- | --- |
| 0 ... 200 | 15 |
| 200 ... 500 | 30 |
| 500 ... 1000 | 60 |

With this information, it is possible to determine (405)

$$P_{trans}Max[j]=\min(P_{bw}Max[j],P_{enc}Max[j]) \quad (1)$$

and $$F_{trans}Max[j]=\min(F_{bw}Max[j],F_{enc}Max[j]). \quad (2)$$

Note that $bw_j$, $P_{enc}Max[j]$, and $F_{enc}Max[j]$ can change over time as network conditions and the computational load of any resources shared by the decoder(s), such as the CPU load in a software implementation of the encoder that is shared with other software components, change. Consequently, the values for $P_{trans}Max[j]$ and $F_{trans}Max[j]$ can advantageously be updated from time to time, for example every ten seconds (406).

Stage 2

In this stage, determined are the maximum window size, $WS_{receive}Max$, minimum window size, $WS_{receive}Min$, maximum pixel rate, $PixRate_{receive}Max$, and minimum pixel rate, $PixRate_{receive}Min$, collectively "bounds information", given computational and downlink bandwidth constraints and the active layouts of all receiving endpoints. The values $WS_{receive}Max$, $WS_{receive}Min$, $PixRate_{receive}Max$, and $PixRate_{receive}Min$ may advantageously be computed in the SECM (218).

In this stage, first, the SECM (218) receives over control link (219) from the EDCM(s) (210) in the j receiving endpoints the following receiver-local information:

Largest window size of the $i^{th}$ receiver's active layout, $WS_{large}[i]$

Smallest window size of the $i^{th}$ receiver's active layout, $WS_{small}[i]$

Pixel rates associated with the largest and smallest window sizes of the $i^{th}$ receiver's active layout, $PixRate_{large}[i]$ and $PixRate_{small}[i]$ respectively.

Figure 5:
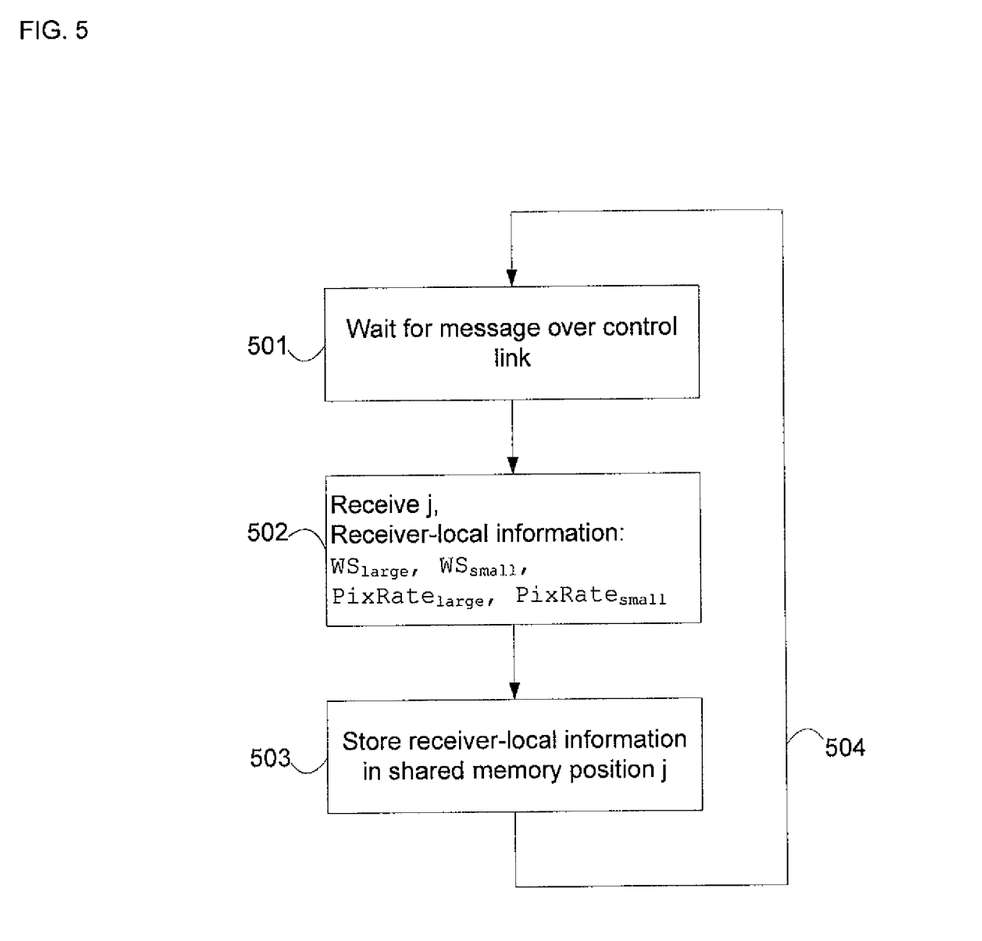
FIG. 5 is an exemplary procedure according to an embodiment of the invention.

The receptions of the receiver local information from the j receiving endpoints do not have to be synchronized. Instead, the SECM (218) can maintain a shared memory with j positions, which can store the most recently received receiver local information from the $j_t h$ endpoint. The mechanism that determines the bounds information, described later, can access the shared memory whenever it needs to execute. The reception of receiver-local information can advantageously be implemented in its own process as outlined in FIG. 5. The process can operate in an endless loop (504). It can wait (501) for a reception of receiver local information from any endpoint (502). Part of the receiver-local information can be the identification of the endpoint, j. Once the receiver-local information has been received, it can be stored in the memory at position j (503), and the loop continues (504) waiting for the next reception from the same or another endpoint.

Referring again to FIG. 2, The total downlink bandwidth available to an endpoint may be divided into unequal portions, one for each bitstream destined for that receiving endpoint (203). Each SVC decoder (212) receives a portion of the total downlink bandwidth. The bandwidths, $BW_{large}[i]$ and $BW_{small}[i]$ associated with the bitstreams that are decoded by an SVC decoder (212) and displayed in the largest and smallest windows in the $i^{th}$ receiver's active layout respectively (215, 214) are known in the SVCS, as the SVCS's SVC stream generator (217) generates those streams.

Figure 6:
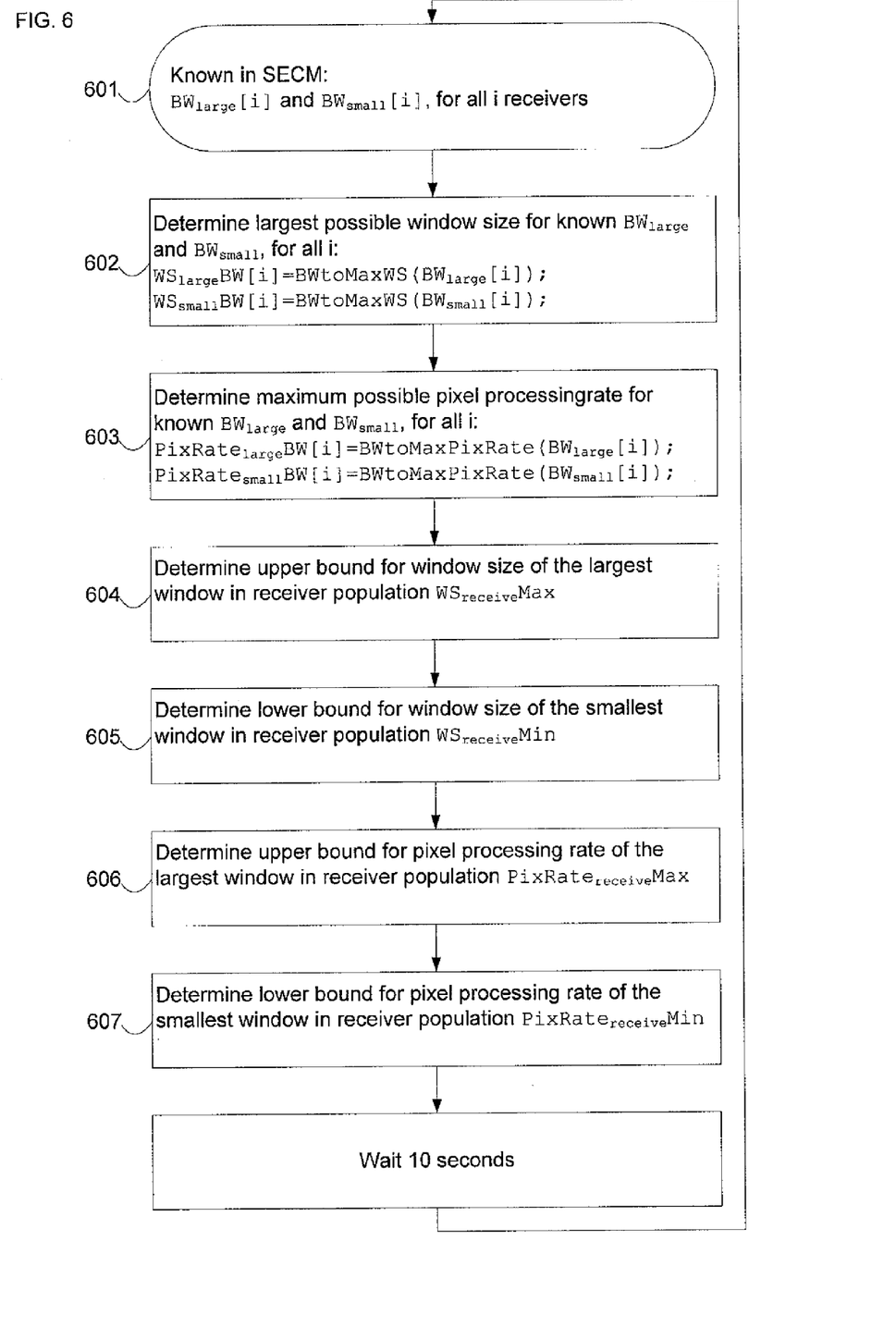
FIG. 6 is an exemplary procedure according to an embodiment of the invention.

Referring now to FIG. 6, the following mechanism can be used to compute the bounds information. As mentioned above, known in the SVCS are, for all i receivers, $BW_{large}[i]$, $BW_{small}[i]$ (601). First, determined (602) are the largest window sizes that $BW_{large}[i]$ and $BW_{small}[i]$ can support, $WS_{large}BW[i]$ and $WS_{small}BW[i]$ respectively, for example by using a lookup function, BWtoMaxWS( ).

Likewise, $PixRate_{large}BW[i]$, the maximum pixel rate that $BW_{large}[i]$ can support and $PixRate_{small}BW[i]$, the maximum pixel rate that $BW_{small}[i]$ can support may be computed (603) using BWtoMaxPixRate( ).

The two lookup functions referred to in the above paragraph share similar properties as discussed above for BWtoMaxPicArea( ).

BWtoMaxWS( )

TABLE 3

| Bandwidth (Kbps) | Maximum Window Size (pixels) |
|---|---|
| 0 ... 200 | 230,400 |
| 200 ... 500 | 921,600 |
| 500 ... 1000 | 3,686,400 |

BWtoMaxPixRate( )

TABLE 4

| Bandwidth (Kbps) | Maximum Pixel Rate (pixels/second) |
|---|---|
| 0 ... 200 | 864,000 |
| 200 ... 500 | 6,912,000 |
| 500 ... 1000 | 27,648,000 |

Based on this information, the following can be determined:

An upper bound for the window size of the largest window in all active layouts of the receiver population (604):

$$WS_{receive}\text{Max} = \max_i [\min(WS_{large}BW[i], WS_{large}[i])] \quad (3)$$

A lower bound for the window size of the smallest window in all active layouts of the receiver population (605):

$$WS_{receive}\text{Min} = \min_i [\min(WS_{small}BW[i], WS_{small}[i])] \quad (4)$$

An upper bound for a pixel processing rate of the largest window in all active layouts of the receiver population (606):

$$PixRate_{receive}\text{Max} = \max_i [\min(PixRate_{large}BW[i], PixRate_{large}[i])] \quad (5)$$

A lower bound for a pixel processing rate of the smallest window in all active layouts of the receiver population (607)

$$PixRate_{receive}\text{Min} = \min_i [\min(PixRate_{small}BW[i], PixRate_{small}[i])] \quad (6)$$

Note that $BW_{large}[i]$, $BW_{small}[i]$, $WS_{large}[i]$, $WS_{small}[i]$, $PixRate_{large}[i]$, and $PixRate_{small}[i]$ can change in time as video sources enter and leave the call and network conditions and receiving endpoint CPU workloads change. Consequently, the values for $WS_{receive}\text{Max}$, $WS_{receive}\text{Min}$, $PixRate_{receive}\text{Max}$, and $PixRate_{receive}\text{Min}$ can advantageously be updated from time to time, for example every ten seconds, using the then available values in the shared memory.

Stage 3

For the encoder in the $j^{th}$ endpoint, the maximum picture area, $P_{max}[j]$, and frame rate, $F_{max}[j]$, may be computed by the EECM (204) in the sending endpoint (201) as described now. The mechanism takes as input the maximum encodable picture area, $P_{trans}\text{Max}[i]$, and maximum frame rate, $F_{trans}\text{Max}[j]$, as determined in stage 1, as well as bounds information ($WS_{receive}\text{Max}$, $WS_{receive}\text{Min}$, $PixRate_{receive}\text{Max}$, and $PixRate_{receive}\text{Min}$) as determined in stage 2 in the SECM (218), and communicated over control link (208) to the EECM (204).

The number of spatial layers and scale factors can be determined by partitioning a $P_{max}[j]/P_{min}[j]$ value space. The subsections that follow detail the derivation of the encoder configuration parameters.

Figure 7:
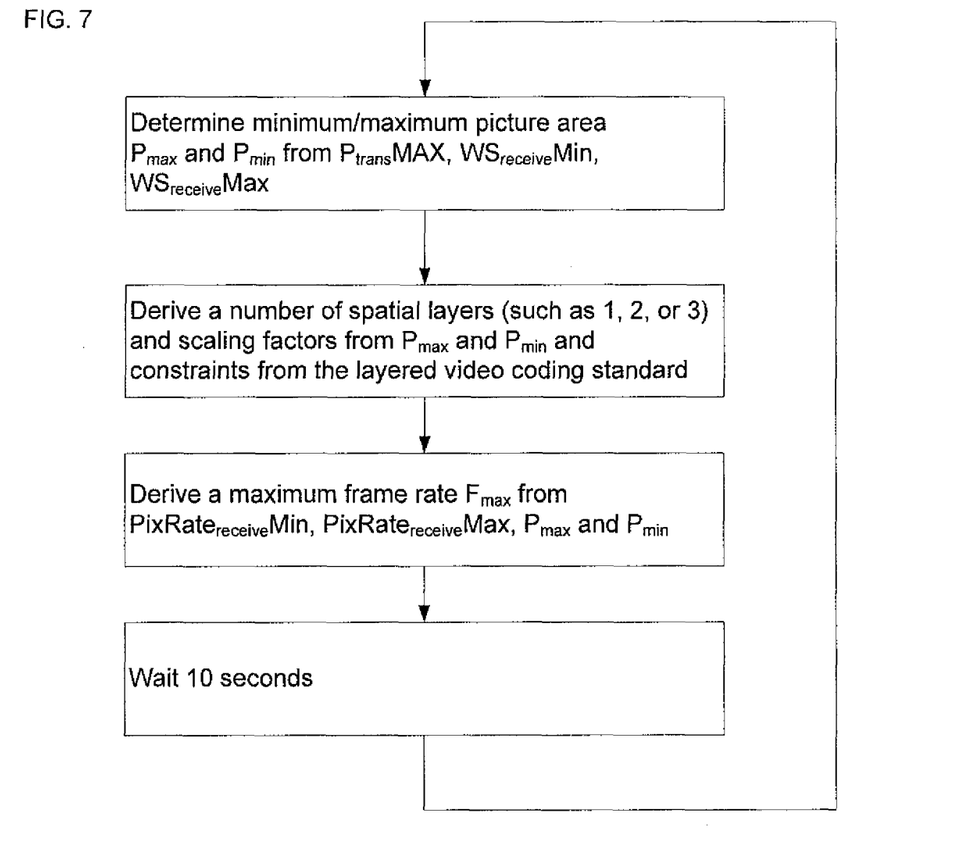
FIG. 7 is an exemplary procedure according to an embodiment of the invention.

Referring to FIG. 7, stage 3 can be divided into x sub-stages in an exemplary embodiment. In sub-stage 3.1 (701), a maximum and minimum picture area can be determined, taking into account encoder capabilities (determined in stage 1), the minimum/maximum window sizes in the active layouts of the receiver population (as determined in stage 2), constraints related to the layered video coding standard in use (namely the largest scale factor, LSF), and modification parameters that may include preferred coded picture sizes.

Sub-stage 3.2 (702) derives from the results of sub-stage 3.1 (minimum/maximum picture area) an appropriate layering structure for the spatial layering, as well as the scaling factors. The description below focuses on scenarios including two or three spatial layers, with scaling factors between 1.5 and 2.0—which are operation points that can be supported by compliant H.264 SVC video encoders.

Sub-stage 3.3 (703), finally, determines the maximum frame rate that is sensible taking into account encoder capabilities (determined in stage 1), minimum/maximum pixel processing rates o of the receiver population (determined in stage 2), and results of sub-stages 3.1 and 3.2.

As in the earlier stages, also the mechanisms of stage 3 can advantageously be exercised at regular intervals, for example every 10 seconds (704), so to be able to reflect changes in the receiver population or bandwidth constraints in the video coding. Further details of the exemplary sub-stages are set forth below.

Stage 3.1: Determination of Maximum and Minimum Picture Area

An SVC encoder in a call may be required to encode a range of picture sizes. The mechanism describing the derivation of the maximum picture area, $P_{max}[j]$, and the minimum picture area, $P_{min}[j]$, for the $j^{th}$ encoder is described below. LSF stands for large scale factor and is henceforth assumed to be 2.0, which is the largest scale factor allowed by the Scalable Baseline profile as defined in ITU-T Rec. H.264. The mechanism works equally well for other values of LSF. The notation used henceforth is C++-style pseudo code, which is readily comprehensible by a person skilled in the art.

```
P_min[j] = min(P_trans Max[j], WS_receive Min); // Compute minimum picture area
Mp = min(P_trans Max[j], WS_receive Max); // Compute maximum picture area
if (Mp > (LSF*LSF) * (LSF*LSF) * P_min[j]) {
    P_max[j] = (LSF*LSF) * (LSF*LSF) * P_min[j];
} else {
    P_max[j] = Mp;
}
```

In practice, the values of $P_{min}[j]$ and $P_{max}[j]$ may advantageously be modified to match commonly used picture sizes such as 360p, 540p, 720p, etc. This modification will produce a maximum picture area that is less than or equal to $P_{max}[j]$ (and greater than or equal to $P_{min}[j]$).

Stage 3.2: Determination of the Number of Spatial Layers, and Scale Factors

To understand how the number of spatial layers and scale factors are determined, it is useful to consider the various spatial configuration cases as a partition of the value space of the ratio $P_{max}[j]/P_{min}[j]$, for an LSF of 2.0, and a Small Scale Factor (SSF), with an assumed value of 1.5. SSF is chosen as 1.5 herein for a number of reasons. First, by scaling an enhancement picture to 1.5 the size, in both x and y dimension, the resulting pixel count of the enhancement layer picture is SSF*SSF==1.5*1.5=2.25 times the number of pixels of the enhancement layer. This number fits in nicely since the maximum enhancement layer size (contains LSF*LSF==2.0*2.0==4 times the number of pixels of the base layer). As a result, the "cost" associated with the encoding of an enhancement layer expressable in pixel count goes up by roughly a factor of 2 between base, SSF-sized enhancement layer, and LSF sized enhancement layer, respectively. Second, a scaling factor of 1.5 (for SSF) and 2.0 (for LSF) allows for simplified interpolation filtering.

Figure 3:
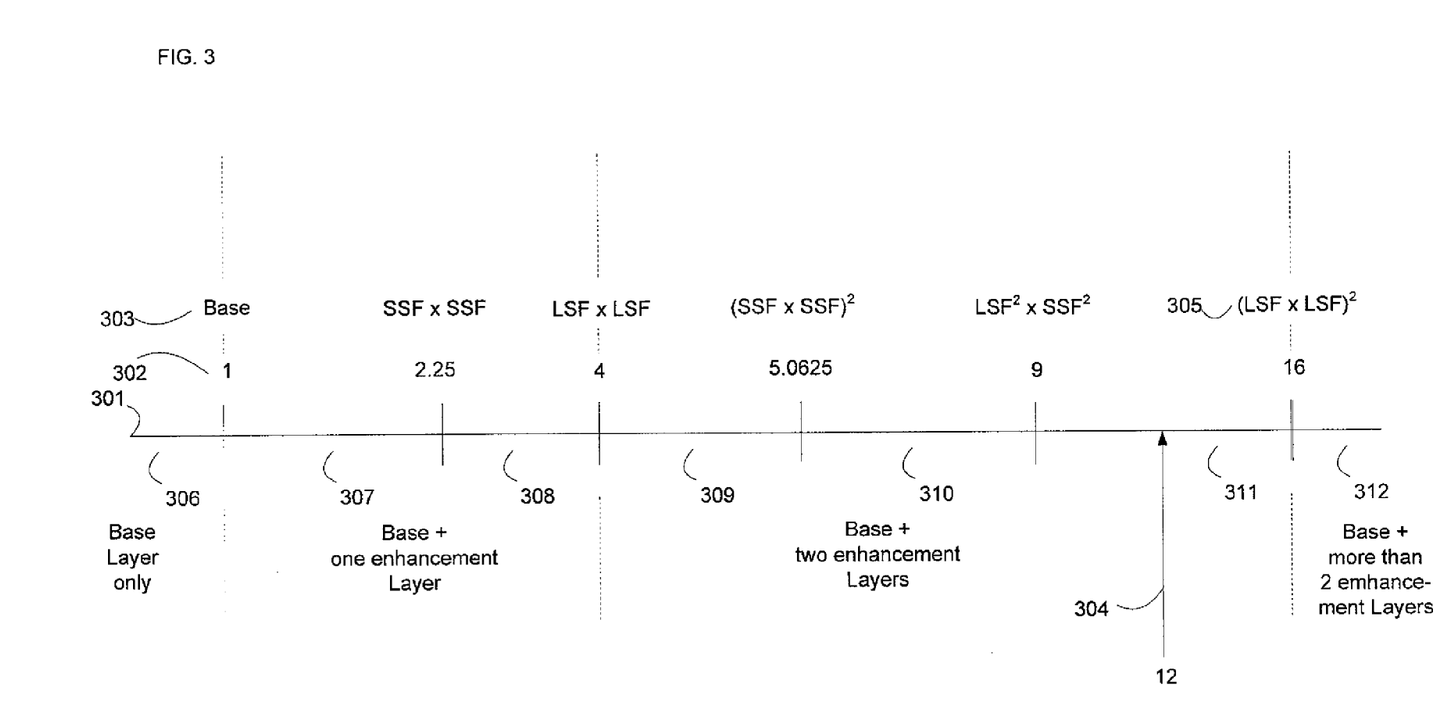
FIG. 3 is a diagram showing the relationship between number of layers and scale factors.

Referring to FIG. 3, depicted on axis (301) are scale factors (302) and the factors of SSF and/or LSF (303) that result in those scale factors. For example, a scale factor of 1 is equivalent to the base layer resolution. For the interval of scaling factors between 0 and 1 (306), base layer resolution is sufficient and no enhancement layer is needed. For the interval between 1 and 2.25, one enhancement layer is needed at SSF resolution (307). For the interval between 2.25 and 4, one enhancement layer is still sufficient, but it needs to be in LSF resolution. For scale factors between 4 and 16, two enhancement layers are needed. At the interval between 4 and 5.0625, these two enhancement layers can be both in SSF resolution. Between 5.0625 and 9, one enhancement layer can be in SSF, but the other needs to be in LSF resolution (310). Scale factors between 9 and 16 require two enhancement layers in LSF resolution (311). This logic can be extended to very large scale factors and a very high number of scale factors, but to preserve clarity, this disclosure does not describe in detail embodiments with more than two enhancement layers.

As an example, assume that a scale factor of 12 is needed. The value 12 (304) lies in the interval (311) between 9 and 16, and, therefore, the layer scaling for 16 is needed (305).

The choice of scale factors for all the intervals is relatively straight forward except for the interval between $(SSF*SSF)^2$ and (LSF*SSF). When numbering the layers, in order of their dependency, as 1 (Base) 2 (first enhancement, based on base), and 3 (second enhancement, based on enhancement 1), in the interval mentioned, one has the choice to select layer 1 to be scaled at SSF and layer 2 as LSF, or vice versa. While it is possible to devise mechanisms to optimally select between these two alternatives (and those mechanisms may become a necessity when using more than two enhancement layers), according to an embodiment of the invention the ScaleFactorLayer2to3 is set to SSF and the ScaleFactorLayer1to2 is set to LSF, as this combination handles the important 1080p/720p dimension case well.

The mechanism for determining the number of spatial layers and scale factors is described using the pseudo code below. The parameter ScaleFactorLayer1to2 refers to the scale factor used to determine the relationship between the dimensions of the base layer (layer 1) and the first spatial enhancement layer (layer 2). Similarly, ScaleFactorLayer2to3 refers to the scale factor used to determine the relationship between the dimensions of the first and second spatial enhancement layers.

```
#define LSF 2.0 // large scale factor
#define SSF 1.5 // small scale factor
if (P_max[j] <= (LSF * LSF) * P_min[j]) {
    numSpatialLayers = 2; // assuming error resilience is needed
    if (P_max[j] <= (SSF * SSF) * P_min[j]) {
        ScaleFactorLayer1to2 = SSF;
    }
    else {
        ScaleFactorLayer1to2 = LSF;
    }
}
else { // spatial dynamic range too large for 2 layers
    numSpatialLayers = 3;
    if (P_max[j] > (LSF * LSF) * (SSF * SSF) * P_min[j]) {
        ScaleFactorLayer2to3 = LSF;
        ScaleFactorLayer1to2 = LSF;
    } else if (P_max[j] <= (SSF * SSF) * (SSF * SSF) * P_min[j]) {
        ScaleFactorLayer2to3 = SSF;
        ScaleFactorLayer1to2 = SSF;
    } else { // mixed scale factor case
        ScaleFactorLayer2to3 = SSF;
        ScaleFactorLayer1to2 = LSF;
    } // end else
} // end else
```

Stage 3.3: Determination of the Maximum Frame Rate

The mechanism describing the derivation of the maximum frame rate for the $j^{th}$ encoder, $F_{max}[j]$, is described below. First, the maximum and minimum frame rate can be computed from pixel rate values. Frame rate equals pixel rate divided by picture size. Consequently, $$F_{receive}\text{Max}[j] = \frac{PixRate_{receive}\text{Max}}{P_{max}[j]} \quad (7)$$

$$F_{receive}\text{Min}[j] = \frac{PixRate_{receive}\text{Min}}{P_{min}[j]} \quad (8)$$

When deriving max frame rate from a pixel rate based on the capability of a powerful decoder, the result may be unrealistically high. This situation does not cause a problem since the transmitter constraints on frame rate can limit the final encoder configuration frame rate value to a reasonable number as can be seen below.

```
F_min = min(F_trans Max[j], F_receive Min[j]); // set minimum frame rate
Mf = min(F_trans Max[j], F_receive Max[j]);
if (Mf > 4 * F_min) {
    Mf = Mf/2;
    If (Mf > 4 * F_min) {
        Mf = Mf/2;
    }
}
F_max[j] = Mf;
```

Note that in the pseudo code above the maximum frame rate is capped to be no greater than four times that of the minimum frame rate. This constraint is not an integral part of the mechanism, but helps avoiding unrealistically slow frame rates that would not be appealing to users.

SUMMARY OF THE CONFIGURATION PARAMETERS

The results obtained by stages 1 through 3, and that can be used to configure an SVC encoder, are summarized below. For the $j^{th}$ encoder, 1) $P_{max}[j]$, is the area of the largest spatial enhancement layer. Any picture size subject to (unstated) aspect ratio constraints whose area is less than or equal to $P_{max}[j]$ is acceptable.
2) $F_{max}[j]$, is the frame rate (including all temporal enhancement layers, if any)
3) numSpatialLayers, is the number of spatial layers.
4) ScaleFactorLayer1to2, the scale factor between layer 1 (the base layer) and 2.
5) ScaleFactorLayer2to3, the scale factor between layer 2 and 3 (if applicable).

What is claimed is:

1. A method for video distribution between a plurality of sending endpoints, each including an Endpoint Encoder Configuration Manager (EECM) and an SVC encoder, and a plurality of receiving endpoints, each including an Endpoint Decoder Configuration Manager (EDCM), involving an SVCS Encoder Configuration Manager (SECM), comprising:

receiving a plurality of receiver constraints at the SECM from the EDCMs of at least two of the plurality of receiving endpoints, including a first display window size measured in units of pixels, a second display window size measured in units of pixels, and at least one other parameter;

determining, based on the receiver constraints, a plurality of sender constraints in the SECM, including at least an upper bound and a lower bound for a window size measured in units of pixels, wherein the upper bound is greater than the lower bound;

sending the sender constraints to the EECM of at least one sending endpoint of the plurality of sending endpoints; and changing at least one encoder parameter in the SVC encoder of the at least one sending endpoint based on the sender constraints, wherein the at least one encoder parameter comprises a picture size, the picture size is less than or equal to the upper bound for the window size and greater than or equal to the lower bound for the window size, and at least a bit rate is determined independently from the upper bound of the window size and lower bound of the window size.

2. The method of claim 1, wherein at least one of the receiver constraints includes at least a downlink bandwidth.

3. The method of claim 1, wherein at least one of the receiver constraints includes at least a pixel rate.

4. The method of claim 1, wherein the at least one sender constraint is a minimum pixel rate.

5. The method of claim 1, wherein the at least one sender constraint is a maximum pixel rate.

6. The method of claim 1, wherein the at least one sender constraint is a minimum bandwidth.

7. The method of claim 1, wherein the at least one sender constraint is a maximum bandwidth.

8. A non-transitory computer-readable storage medium comprising software that is configured when executed to direct a processor to perform the methods in one of claim 1, 2, 3, or 4-7.

9. A video distribution system comprising:
   a plurality of receiving endpoints; and
   at least one server including a SECM, the at least one server coupled to the each of the plurality of receiving endpoints,
   wherein the SECM is configured to:
      receive a plurality of receiver constraints at the SECM from EDCMs of at least two of the plurality of receiving endpoints, including a first display window size measured in units of pixels, a second display window size measured in units of pixels, and at least one other parameter;
      determine, based on the receiver constraints, a plurality of sender constraints in the SECM, including at least an upper bound and a lower bound for a window size measured in units of pixels, wherein the upper bound is greater than the lower bound;
      send the sender constraints to an EECM of at least one sending endpoint; and
      change at least one encoder parameter in an SVC encoder of the at least one sending endpoint based on the sender constraints, wherein
      the at least one encoder parameter comprises a picture size,
      the picture size less than or equal to the upper bound for the window size and greater than or equal to the lower bound for the window size, and
      at least a bit rate is determined independently from the upper bound of the window size and lower bound of the window size.

10. The system of claim 9, wherein at least one of the receiver constraints includes at least one of downlink bandwidth, window size, and pixel rate.

11. The system of claim 9, wherein the at least one sender constraint is one of minimum window size, maximum window size, minimum pixel rate, maximum pixel rate, minimum bandwidth, and maximum bandwidth.

* * * * *